United States Patent [19]

Hummel

[11] 4,115,839

[45] Sep. 19, 1978

[54] SELF-SUPPORTING MODULAR SWITCHBOARD PANEL

[75] Inventor: Herbert Hummel, Niedereschach, Fed. Rep. of Germany

[73] Assignee: Hans Kreutzenbeck GmbH, Velbert-Neviges, Fed. Rep. of Germany

[21] Appl. No.: 746,206

[22] Filed: Dec. 1, 1976

[51] Int. Cl.² .......................... H02B 1/04; H01H 9/02
[52] U.S. Cl. ..................................... 361/393; 200/307
[58] Field of Search .............. 361/392, 393, 394, 395, 361/396, 416, 362, 429, 339; 220/23.86, 23.4; 200/307

[56] References Cited

U.S. PATENT DOCUMENTS

| | | | |
|---|---|---|---|
| 3,131,829 | 5/1964 | Masser | 220/23.4 |
| 3,146,505 | 9/1964 | Hansen | 220/23.4 |
| 3,737,730 | 6/1973 | Mauell | 361/416 |
| 3,900,712 | 8/1975 | Fukao | 200/307 |

FOREIGN PATENT DOCUMENTS 2,318,496 10/1973 Fed. Rep. of Germany ........... 361/331

Primary Examiner—J D Miller
Assistant Examiner—Peter S. Wong
Attorney, Agent, or Firm—Blair, Brown & Kreten

[57] ABSTRACT

A self-supporting modular switchboard panel formed from a plurality of rectangular frame elements with four solid side faces. The corner edges are beveled to provide a 45° angle with the side faces so that when four frame elements are placed together to form a rectangular section, the center thereof forms a square which serves as a perch for retention clips and cover fasteners. Projections and grooves are disposed on opposed side faces for various retention possibilities.

15 Claims, 11 Drawing Figures

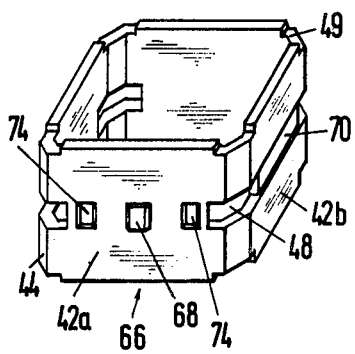
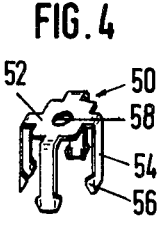
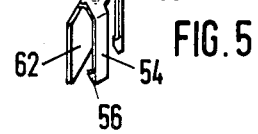
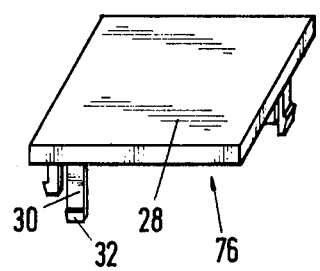
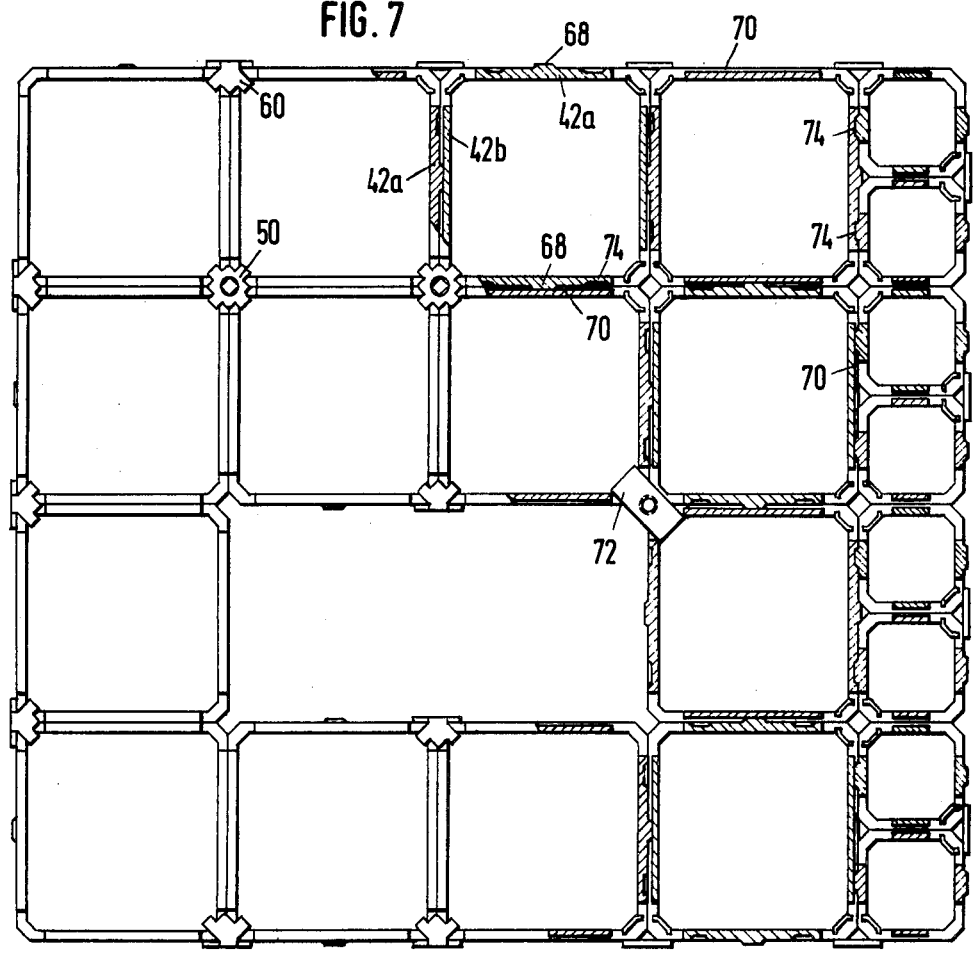

SELF-SUPPORTING MODULAR SWITCHBOARD PANEL

BACKGROUND OF THE INVENTION

This invention relates to a self-supporting modular switchboard panel, the modules of which are formed by a rectangular one-piece frame and the side faces of which modules abut and are held together at the intersections of the frames by means of clips which are pushed over the corners of the respective abutting frames.

Self-supporting modular switchboard panels of numerous designs, in particular for control rooms, have been disclosed in the past. These switchboard panels are constructed screen-like from individual modules. The individual modules may have straight side walls which cross-over, or they may be one-piece rectangular frames. Depending on the type of the modules the joints of the modules may be connected in various ways. As a rule, the modules are screwed together at the joints. One modular switchboard panel is known to the applicant which is constructed from square, frame-shaped modules the side faces of which abut and wherein clips are pushed over the intersections of the abutting corners of the frames from the front and the rear of the switchboard panel, which clips are held together by means of a screw passing through the switchboard panel on the intersections.

The assembly of the modular switchboard panels known to the applicant consumes much time on account of the screwing required at the joints. Furthermore, it is generally difficult to align the front of the switchboard panel so that it is absolutely plane. However, this is extremely important because even a slight unevenness is most conspicuous particularly with large-area switchboard panels. Finally with modular switchboard panels known to the applicant it is possible only with great difficulty to provide apertures or to close existing apertures at a later date after the switchboard panel has been assembled; this may be necessary, e.g. when measuring or indicator instruments must be set in or removed.

SUMMARY AND OBJECTS OF THE INVENTION

The object of this invention is to provide a self-supporting modular switchboard panel which is constructed from cheaply manufactured modules; which is rapidly and simply assembled; which has an exactly plane front face; and in which apertures can be provided or existing apertures can be closed in a simple manner even after the switchboard has been assembled. Furthermore, the connection of the individual modules at the joints must reduce the free space within the individual module cell as little as possible, so that this free space can be completely utilized for the insertion of circuit elements. Finally, the modules should allow the mounting and fastening of the modular front members without additional fastening devices being required which increase the manufacturing costs and reduce the free space in the individual modular cell.

This problem in respect of a self-supporting modular switchboard panel of the aforementioned type is solved according to the invention by providing corner apertures in the centre of the corner edges of the frames which apertures extend normally to these edges, and by providing clips having spring tongues which penetrate into the corners of the frames abutting on the joints and engage in the corner apertures.

The one-piece frames which form the modules and the side faces of which abut, result in a particularly stable and torsion-free construction of the switchboard panel. The individual frames are simply constructed and can be cheaply produced. The assembly and mounting of the switchboard can be performed in an extremely economical manner, because there is no need for connecting the joints of the modules by means of screws.

For the connection of the frames, a clip is placed on each intersection of the abutting corners of the frames and pressed in, e.g. by means of a tool, so that the spring tongues engage in the corner apertures. If clips are attached in the front as well as in the rear of the switchboard panel, an accurately plane arrangement of the modules is ensured without additional expenses. Finally, only the flat spring tongues of the clips used for connecting the modules penetrate into the corners of the frames so that the free space in these frames is not reduced by the connection by means of the clips and can be fully utilized for installing circuit elements or the like.

With the modular switchboard panel according to the invention, openings for measuring instruments or the like can be provided when the panel is being assembled or such openings can subsequently be fitted in the assembled switchboard panel. Because each module comprises a completely closed rectangular frame, these openings do not affect the stability of the self-supporting switchboard panel. If an opening in the switchboard panel must be provided at a later date, the clips on the respective joints need only be removed so that the required number of frames can be removed. In the same manner, of course, an existing opening can be closed at a later date by inserting the required number of frames and by connecting these frames with the panel by means of clips.

In practice, square modules of various sizes are generally used, the side length of which may be e.g. 18, 24, 36 or 48 mm. According to the invention, the frames of one size of modules can be combined with smaller frames of half the modular size. The one side length of these smaller frames may correspond to the total size of the modules and the other side length to half the size, or both side lengths may correspond to half the modular size. This is particularly suitable when the sides of the modular switchboard panel must be made up to the prescribed external dimensions according to the three-dimensional data of the site, or when openings within the panel must be adjusted to the dimensions of instruments to be fitted in.

The corner edges of the frames may suitably extend at an angle of 45° to the side faces. The four abutting frames form thereby an aperture of square cross-section through which a screw may pass. The base of the clips is provided in this case with a through bore. The screws may be used, e.g. for fastening the modular switchboard panel, or they may be used together with iron nuts placed into the corner apertures to fasten circuit elements or instruments in the switchboard panel. Tapping screws screwed into the openings may also be used for fixing instruments or the like.

The construction of a curved modular switchboard panel is also possible without great difficulty according to the invention. Depending on the desired bending radius, each, each second, each third clip etc. or clip series must then be omitted on the one side of the switchboard panel.

In a further development of the invention two side walls of the frames facing one another are provided with outwardly protruding projections in the centre of the frame depth, and the other two side walls are provided with grooves at corresponding height and extending parallel to the upper edge along the whole side wall. When the switchboard is assembled, these projections penetrate into the corresponding grooves of the adjacent frame. This ensures additionally that the frames can be most accurately aligned, so that even the most negligible unevenness in the appearance of the modular switchboard can be avoided. Also in the case of this modification it is possible to bend the switchboard panel because the bending radii usually required are so large that the projections still penetrate into the grooves.

The frame elements according to the invention can be produced in an economic manner by metal pressure casting, particularly by light metal pressure casting or zinc pressure casting. This has the advantage that all the frames are produced from the one casting mould and no manufacturing tolerances occur. The frames may also be injection moulded or compression moulded from synthetic material. In the case of the first design it is even possible to cut or saw the frames from a square metal profile.

The modular front members may suitably be injection moulded from synthetic material, they may be cast or pressed. The front of the modular front member may suitably be matt or roughened in order to avoid glare or reflections on the modular panel.

DESCRIPTION OF THE DRAWINGS

The present invention will now be explained in more detail by way of examples and with reference to the attached drawings, in which:

FIG. 3 is a perspective view of a frame according to a second embodiment of the invention;

FIG. 4 is a pictorial view of a clip for connecting the frames according to the first or second embodiment;

FIG. 5 is a perspective view of a corresponding edge clip;

FIG. 6 is a perspective view of a modular front member which can be used in conjunction with the frame according to the invention;

FIG. 7 is a top plan view of an exemplary assembly according to the second embodiment, which view is partially sectional in the centre plane;

DESCRIPTION OF THE PREFERRED EMBODIMENTS

Figure 1:
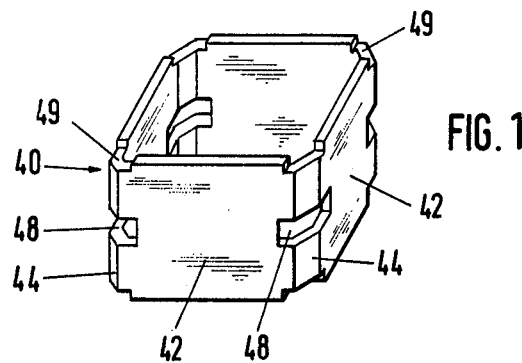
FIG. 1 is a perspective view of a frame according to one embodiment of the invention.
Figure 2:
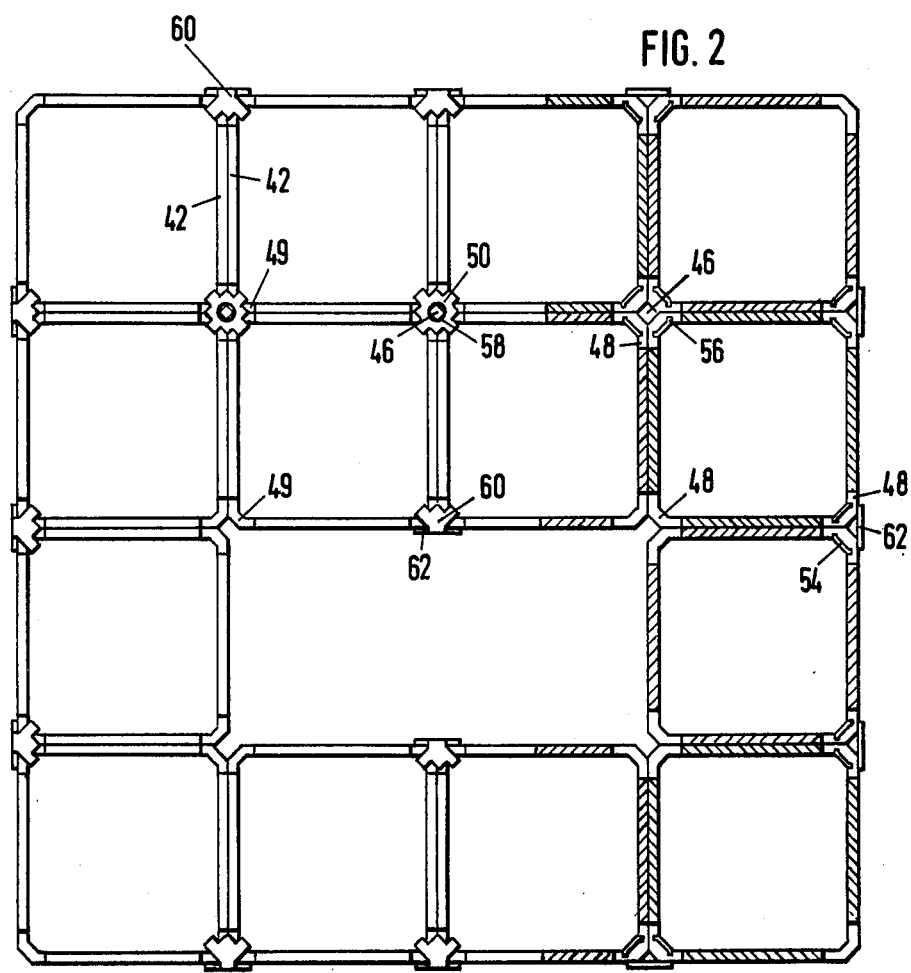
FIG. 2 is a top plan view of an assembled switchboard panel according to this embodiment, which is partially in section in the centre plane.

FIGS. 1 and 2 illustrate a first embodiment of the invention. In this embodiment the modular switchboard panel is assembled from frames 40 which are joined with side faces 42 abutting, as can be seen in FIG. 2. The frames 40 have substantially the shape of a square hollow body. The corner edges 44 of the frames 40 are, however, set at an angle of 45° to the side walls 42.

As can be seen in FIG. 2, an aperture 46 is formed by virtue of the inclination of the four converging corners at the joints of the switchboard module. This aperture may accommodate, e.g. a screw by means of which the panel is fastened or by which an instrument or the like can be fastened in the panel.

As shown in FIG. 1, apertures 48 which extend at right angles to the corner edge, are provided in the centre of the frame depth. The assembled frames 40 are held together by means of clips 50, one of which is illustrated in FIG. 4. Each clip 50 comprises a base 52 and four spring tongues 54 projecting downwardly. The spring tongues 54 are provided with hook-shaped ends 56. For connecting the assembled frames 40, a clip 50 is placed on the intersection where four frames 40 converge, in such a manner that each of the spring tongues 54 penetrates into the corner of a frame 40. The clip 50 is then mounted, e.g. by means of a tool, so that the hook-shaped ends 56 engage in the respective corner apertures 48 of the frames 40. The base 52 of the clip 50 is accommodated in recesses 49 provided at the corners of the front and rear of frames 40, so that the clips do not protrude over the front faces of the side walls 42, said front faces serving as an installation area. In the same manner a clip 50 can be pushed in from the rear and also engages in corner apertures 48 by means of its hook-shaped end 56. A through bore 58 is provided in the base 52 of the clip 50, said through bore being flush with the aperture 46 when the clip is mounted.

Edge clips 60 are provided (one of which is illustrated in FIG. 5) for connecting frames 40 at the edges of the switchboard panel. These edge clips 60 have only two spring tongues 54 which are arranged at an angle of 90° with respect to one another, while the other two spring tongues are replaced by a plate 62 which rests against the outside of two frames 40 to be connected to one another, as can be seen in FIG. 2.

FIG. 2 illustrates an example of a switchboard panel assembled from frames 40. The left hand side of FIG. 2 is a top plan view of the switchboard panel while the right hand side is a section parallel to the surface of the panel at the level of corner aperture 48. The left hand side illustrates the mounting of clips 50, or the edge clips 60, respectively, while the right hand side illustrates how the clips 50 or edge clips 60 pushed in from the rear engage in the corner apertures 48.

FIG. 2 also illustrates how an opening can be left or subsequently be provided in a switchboard panel constructed from frames 40. Such an opening does not affect the stability of the panel. The frame corners converging on the edge of the opening are also connected by the edge clips 60. If such an opening must be made at a later date, the respective clips 50 must merely be removed and the required number of frames 40 can be pulled out of the assembled panel.

A further embodiment is illustrated in FIG. 3. In this example the modular switchboard panel is assembled from frames 66 which correspond substantially to the frames 40 of FIG. 1. However, frames 66 are additionally provided with outwardly protruding projections 68 on two side walls 42a facing one another. These projections 68 are in the centre of side wall 42a. The two other side walls 42b are provided with grooves 70 which extend over the whole outside of side walls 42b at half the height of said walls. When frames 66 are assembled to form a switchboard panel, as illustrated in FIG. 7, each projection 68 of one frame 66 projects into the corresponding groove 70 of the adjacent frame. This ensures a particularly accurate alignment of frames 66 in the plane of the panel.

FIG. 7 illustrates the assembly of frames 66 to a modular switchboard panel. The joining of the frames at the intersections of the modules is effected by means of clips 50 or edge clips 60, respectively, illustrated in FIGS. 4 and 5. The illustration of FIG. 7 corresponds to the illustration of FIG. 2, so that an explanation is superfluous.

The right hand side of FIG. 7, however, additionally illustrates how frames having a smaller modular dimension can be built into the panel. For example, a module having an outside diameter of 36 mm may be supplemented by a module having an outside diameter of 18 mm, or a module of 48 mm outside diameter by a module of 24 mm outside diameter. FIG. 7 illustrates the completion of the panel by smaller modules which take up a quarter of the area of the normal module. It is also possible, of course, to use additional frames having half the area of the basic module, these frames not being square, of course. The use of frames of smaller modular size is, of course, also possible with the embodiment illustrated in FIGS. 1 and 2.

FIG. 7 also illustrates how a screw with a punched nut 72 can be inserted into the aperture 46, which is suitable, for example, for fastening instruments in the panel. The elongated shape of nut 72 prevents turning of the nut when the screw is screwed in.

Figure 8:
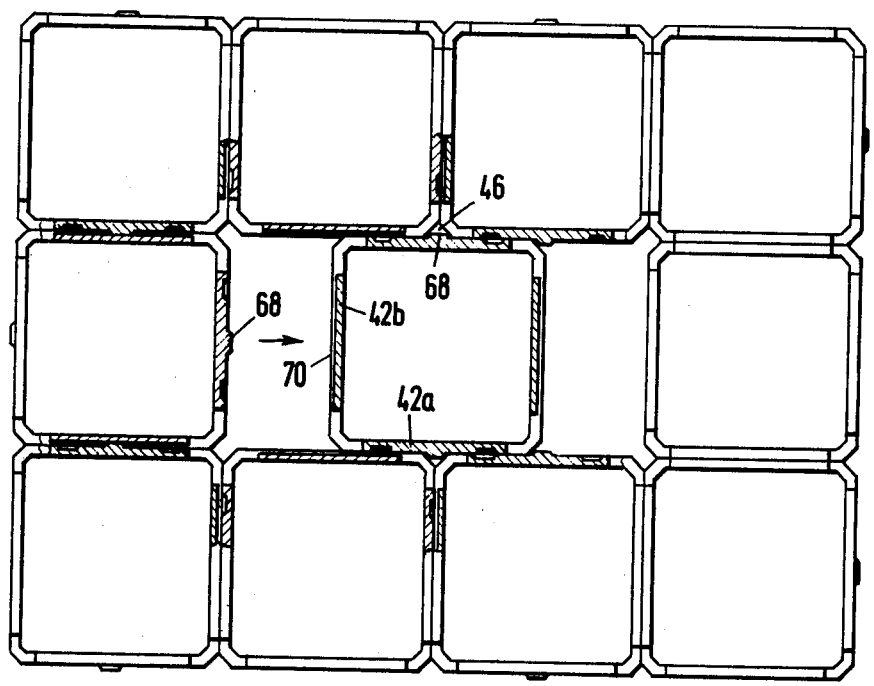
FIG. 8 illustrates the subsequent insertion or removal of a frame according to FIG. 3 from the assembled switchboard panel, the clips having been omitted for the sake of clarity.

If an opening must be provided at a later date in a modular switchboard panel constructed from frames according to FIG. 3, it is not possible in the simple manner described with reference to FIG. 1. The projections 68 penetrating into the grooves 70 prevent the removal of a frame 66 built into the interior of the panel, even when clips 50 are removed. In order to provide an opening in a panel at a later date, it is necessary with a frame according to FIG. 3 to damage one of these frames by breaking-off the projections 68 so that it can be removed. The further frames can then be removed without being destroyed, as illustrated in FIG. 8. The frame 66 is displaced sideways to this end whereby the projections 68 slide in the groove 70 in the adjacent frames until they reach the aperture 46 formed by the inclination 44 of the adjacent frames. In this position the frame 66 can be pulled out while the projections 68 slide in the respective apertures 46.

Figure 9:
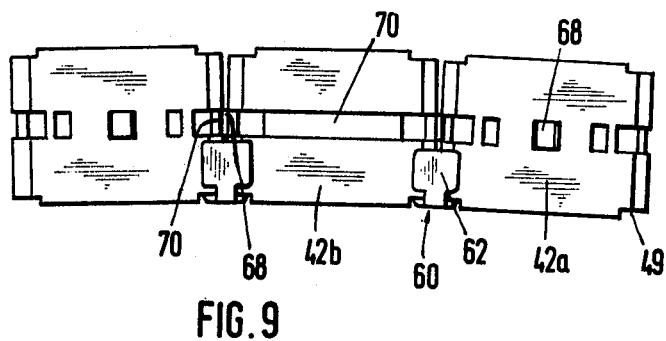
FIG. 9 is a side elevation of a curved switchboard panel according to the second embodiment.

In the case of a switchboard panel assembled from frames 66 as shown in FIG. 3, it is also possible to curve the switchboard panel, or the modular switchboard design. As illustrated in FIG. 9 it is also necessary to this end, as in the embodiment according to FIGS. 1 and 2, to remove completely or partially or omit, respectively, the clips 50 on one side of the panel. The modular switchboard panel can then be bent because the gap between the frames on the outside of the curved panel is so negligible with the bending radii usual for modular switchboard designs, that the projections 68 do not lose contact with grooves 70. As shown in FIG. 3, the side walls 42a which are provided with projections 68 are also provided with recesses 74 which are positioned at the level of projection 68 and at a quarter of the diameter of the side wall 42a. These recesses 74 serve for accommodating the projections 68 of the frames of half the modular size, as shown at the right hand edge in FIG. 7. The side walls of the frames of half the modular size and provided with projections 68 rest alternately in pairs on a side wall 42a and on a side wall 42b of frames 66 of the larger modular size, as can be seen in FIG. 7. If these side walls rest against a side wall 42b, the projections of the frames of smaller modular size project into the groove 70, while in the other case they project into the additional recesses 74.

FIG. 6 illustrates a modular front member 76 which may be used in conjunction with the frames 40 or 66 of FIGS. 1 or 3, respectively. The modular front member 76 comprises a front plate 28 and spring tongues 30 which protrude from the rear of front plate 28. Two spring tongues 30 having hook-shaped ends 32 are provided at two diagonally opposing corners of front plate 28. The two spring tongues 30 on each corner are arranged slightly displaced from the corner on each side of this corner. When the modular front member is mounted in the frames 40 or 66, the hook-shaped ends 32 of the spring tongues 30 engage in the corner apertures 48 on both sides of the spring tongues 54 of clips 50 or 60. Because the clips 50 or 60, respectively, are accommodated by the recesses 49 in mounted condition, the front plate 28 of the modular front member can rest completely against the front of the switchboard panel.

Figure 10:
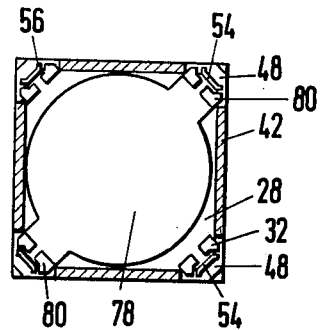
FIG. 10 illustrates the mounting of a modular front member and a circuit element according to the invention.
Figure 11:
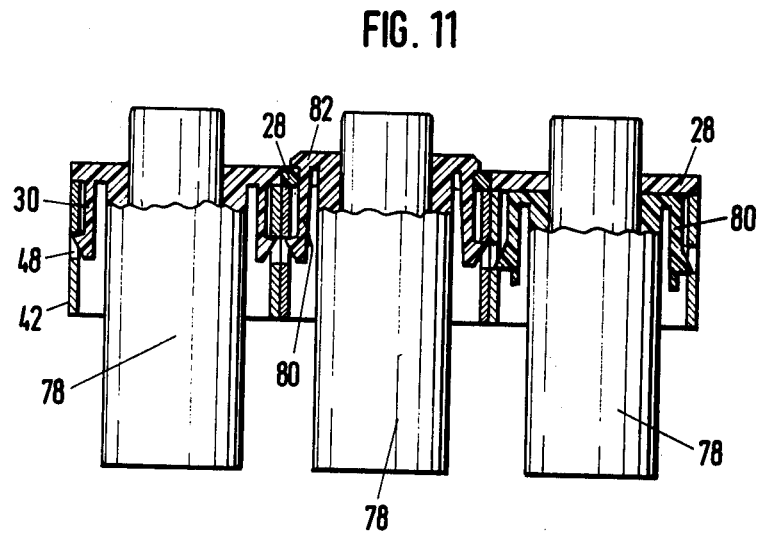
FIG. 11 illustrates various possibilities for installing circuit elements in conjunction with modular front members.

FIGS. 10 and 11 illustrate fastening possibilities for circuit elements which must be installed in the switchboard panel. These may be switches, electronic components, luminous indicators such as command, warning or signal devices or the like.

Such a circuit element 78 which, for example, has a circular cross-section, is illustrated in FIGS. 10 and 11. FIG. 10 is a cross-section at the centre of the frame depth of a frame equipped with a circuit element. FIG. 11 is a longitudinal section of the frame.

FIG. 10 illustrates a frame 40 according to FIG. 1, the arrangement being the same in corresponding manner also for frames 66 of FIG. 3.

A modular front member 76 is supported in the aforedescribed manner in the corner apertures of two corners of the frame, said corners facing one another diagonally. The front plate 28 of the modular front member is provided with a circular hole in which the circuit element 78 is inserted. The circuit element is provided with spring tongues 80 on two diagonally facing corners, the spring tongues being designed and arranged correspondingly to the spring tongues of the modular front member 76. These spring tongues penetrate in corresponding manner on both sides of the spring tongues 54 of clip 50 or 60, respectively, into the corner apertures 48 on those corners of the frame where there are no spring tongues 30 of the modular front member 76.

FIG. 10 illustrates particularly clearly the large free space within the frames which is not reduced by the connection on the intersections. The whole inside width of the frames can therefore be utilized for the mounting of the circuit elements.

FIG. 11 illustrates various possibilities as to how the circuit element 78 can be combined with the modular front member 76. The example illustrated on the left hand side of FIG. 11 shows the circuit element 78 as an integrated component of the modular front member. The mounting of this structural part integrating modular front member and circuit element can be done in the same manner as has been described in connection with modular front member 76. The arrangement of FIG. 10 is therefore superfluous in this case.

The centre of FIG. 11 illustrates an arrangement wherein a modular front member provided with a hole is mounted in the frame in the aforedescribed manner. The circuit element 78 has a collar 82 which protrudes from this hole in the front member and is inserted into the front member from the front of the modular circuit panel until the collar 82 rests on the front member 76 and the spring tongues 80 of the circuit element 78 engage in the corner apertures 48. In this case the spring tongues 30 of the modular front member engage in a pair of diagonally facing corner apertures 48 and the spring tongues 80 of circuit element 78 engage in the other pair of diagonally facing corner apertures 48, as illustrated in FIG. 10.

In the examples on the left hand side and the centre of FIG. 11 the circuit element 78 is always inserted from the front of the switchboard panel.

On the right hand side of FIG. 11 an example is illustrated where the circuit element is inserted from the rear of the panel.

This has the advantage that the wiring of the circuit element can be done before it is inserted in the switchboard panel and need not be separated if the circuit element must be removed at a later date or must not be pulled out through the hole in the front plate. Also in the example illustrated on the right hand side of FIG. 11 a modular front member is mounted in the usual manner and the circuit element is inserted from the rear of the panel through the hole of the front plate. The spring tongues 80 of the circuit element may in this case be provided with hook-shaped ends projecting in the opposite direction in order to prevent the circuit element from sliding out to the rear. Small rims on the spring tongues facilitate the compression when the circuit element is removed. Also in this example of FIG. 11 the spring tongues of the modular front member and the spring tongues of the circuit element engage in one of the pairs of diagonally facing corner apertures, as illustrated in FIG. 10.

I claim:

1. A self-supporting modular switchboard panel comprising: a plurality of substantially rectangular one-piece frame elements having closed faces on four sides and open top and bottom faces disposed in matrix-type array whereby a side face of each adjacent frame element is in tangential parallel relation with an adjacent frame side face along inner portions of the matrix-type array, and said four sides of said frame elements define corner edges where the sides meet wherein said edges are set at an angle of substantially 45° relative to the side faces so that the intersection of four corner edges of four frames define a square-shaped aperture, and means for fastening said frames together at said corner edges whereby said frames are constrained from motion and the top and bottom faces of all frames are all coplanar and said means for fastening said frames lie below said top face and above said bottom face.

2. The panel of claim 1 in which said means for fastening said frames includes recesses on top and bottom extremities of said corner edges, apertures medially disposed on said corner edges, and clip members comprising a base member fashioned to nest in said recesses, plural spring tongue members extending from said base members having hook-shaped ends disposed on extremities of tongue members remote from said base, all said hook-shaped ends projecting orthogonally from said tongue members and in the inward direction of said base whereby said spring tongue members extend within said frame elements and are tangent to an inner surface of said corner edges and said hook-shaped ends extend into said apertures and are retained thereagainst.

3. A modular switchboard panel according to claim 2 wherein the clips including four spring tongues.

4. A modular switchboard panel according to claim 2, wherein the clips are provided for the corners of the frames abutting at an outer edge of the switchboard panel including two spring tongues and a plate resting on an outer side face of the frames which is connected to said base.

5. A modular switchboard panel according to claim 3 characterized in that the base of the clips is provided with a through bore.

6. A modular switchboard panel according to claim 1, wherein two opposing side walls of the frames are provided at the centre of the frame depth with outwardly protruding projections and that the two other side walls are provided with medial grooves extending parallel to the top edge over the whole side wall.

7. A modular switchboard panel according to claim 6, including additional recesses provided on the side faces which are provided with projections, which recesses are arranged between the projection and the corner edges of the side wall and at the same height as the projection.

8. The panel of claim 5 including an elongated nut having a threaded opening which registers the through bore in said base to provide a clamp to secure a front member on the top face of said frame element when a screw is fastened to said nut.

9. The panel of claim 7 wherein some of said frame elements are comprised of a side face length one half the side face length of other frame elements.

10. A modular switchboard panel of claim 1 wherein modular front members are provided on at least two diagonally opposing corners with two spring tongues which are so displaced relative to the corners of the modular front member that they can engage by means of their hook-shaped ends in the corner apertures at both sides of the spring tongues of clips.

11. A modular switchboard panel according to claim 10, wherein the modular front members are provided only on two diagonally opposing corners with engageable spring tongues and are provided in its centre with a hole through which a circuit element can be inserted which element is provided with corresponding engageable spring tongues on those points which correspond to the two other corners of the modular front member.

12. A modular switchboard panel according to claim 2 wherein the frames are produced by metal pressure casting.

13. A modular switchboard panel according to claim 2 wherein the frames are injection moulded or compression moulded from synthetic material.

14. A modular switchboard panel according to claim 10 wherein the modular front members are injection moulded or compression moulded from synthetic material.

15. A modular switchboard panel according to claim 14 wherein the front area of the modular front members is matt.

* * * * *